(12) United States Patent
Sakabe et al.

(10) Patent No.: US 8,923,674 B1
(45) Date of Patent: Dec. 30, 2014

(54) OPTICAL FIBER AND OPTICAL CABLE

(71) Applicant: Sumitomo Electric Industries, Ltd., Osaka-shi, Osaka (JP)

(72) Inventors: Itaru Sakabe, Yokohama (JP); Yuya Homma, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/933,378

(22) Filed: Jul. 2, 2013

(51) Int. Cl.
*G02B 6/44* (2006.01)
*G02B 6/02* (2006.01)

(52) U.S. Cl.
CPC .................. *G02B 6/02395* (2013.01)
USPC ............. 385/100; 385/126; 385/128

(58) Field of Classification Search
USPC ............ 385/123–128, 144–145, 100
See application file for complete search history.

(56) References Cited

U.S. PATENT DOCUMENTS

| | | | | |
|---|---|---|---|---|
| 5,376,484 A | * | 12/1994 | Iwagaki | 430/21 |
| 5,527,835 A | * | 6/1996 | Shustack | 522/42 |
| 2002/0071113 A1 | * | 6/2002 | Moran et al. | 356/128 |

FOREIGN PATENT DOCUMENTS

| | | | | |
|---|---|---|---|---|
| JP | 2004078092 A | * | 3/2004 | G02B 6/44 |
| JP | 2006-133669 A | | 5/2006 | |
| JP | 2007-199525 A | | 8/2007 | |
| JP | 2012-223013 A | | 11/2012 | |

* cited by examiner

*Primary Examiner* — Ellen Kim
(74) *Attorney, Agent, or Firm* — Drinker Biddle & Reath LLP

(57) ABSTRACT

The present invention relates to an optical fiber and an optical cable which can be used for a long term even under environments in which an oil content migrates into them, and the optical fiber has a glass fiber extending along a predetermined axis, and a coating. The coating is composed of a plurality of layers each of which is comprised of an ultraviolet curable resin or a thermosetting resin, and swelling rates of the respective coating layers are set so that they increase from an outer peripheral surface of the glass fiber to an outer peripheral surface of the cable jacket.

7 Claims, 7 Drawing Sheets

OPTICAL FIBER AND OPTICAL CABLE

BACKGROUND OF THE INVENTION

1. Field of the Invention

The present invention relates to an optical fiber and an optical cable including a glass fiber.

2. Related Background Art

Studies have been conducted in recent years on uses of optical fiber in very short-range areas as well, e.g., uses in industrial robots and automobiles, and optical fiber cables obtained by coating an optical fiber with resin have been used under high-temperature environments in which oil or a PVC (polyvinyl chloride) electric cable is present around them, particularly, in the uses in industrial robots and automobiles.

For example, Japanese Patent Application Laid-Open Publication No. 2012-223013 (Literature 1) discloses an example of a harness in which an optical fiber cable and an electric cable are bundled. In view of the foregoing use environments, an optical fiber with superior resistance to ethanol is disclosed in Japanese Patent Application Laid-Open Publication No. 2006-133669 (Literature 2) and an overcoated optical fiber easy to remove an overcoat layer is disclosed in Japanese Patent Application Laid-Open Publication No. 2007-199525 (Literature 3). A jacket of the optical fiber disclosed in Literature 2 is set so that a coating layer located inside has a larger swelling rate than a coating layer located outside. The overcoated optical fiber disclosed in Literature 3 is set so that a coating layer located inside has a smaller crosslink density than a coating layer located outside.

SUMMARY OF THE INVENTION

The Inventors conducted research on the conventional optical cables and found the problem as described below. Namely, when the optical cable is used under the high-temperature environment in which oil or the PVC electric cable is present around it, a plasticizer with a low molecular weight migrates into the optical fiber, which caused such a trouble that the coating of the optical fiber became cracked in long-term deterioration evaluation.

FIG. 1 is a drawing for explaining a state of the aforementioned trouble (migration of plasticizers from PVC electric cables into an optical fiber). FIG. 1 shows a situation (cross-sectional view) in which an optical cable 1 and PVC electric cables 2A, 2B are set in contact. The optical cable 1 has an optical fiber 10 (one in which a glass fiber including a core and a cladding is coated with resin, or, one in which a hermetic coat layer is further provided on an outer peripheral surface of the cladding and is coated with resin), and a cable jacket 20 surrounding the optical fiber 10. The PVC electric cable 2A has a metal signal wire 20A and a resin layer 21A surrounding it, and the PVC electric cable 2B has a metal signal wire 20B and a resin layer 21B surrounding it. It should be noted herein that the cable jacket 20 is not always set in contact with the optical fiber 10. The optical cable may be one in which aramid fiber is set along and around the periphery of the optical fiber 10 and the cable jacket 20 is laid over it.

As shown in FIG. 1, while the optical cable 1 is placed together with the PVC electric cables 2A, 2B under the high-temperature environment for a long term, the plasticizers in the PVC electric cables 2A, 2B or oil migrates through the optical cable jacket 20 into the optical fiber 10. The melting points of the plasticizers are lower than that of the cable jacket 20 and thus the plasticizers are more likely to migrate as the molecular weights thereof become smaller. It is difficult to prevent the migration, particularly, of the plasticizers having the molecular weight of not more than 1000. A plurality of coating layers constituting the cable jacket 20 are comprised of urethane acrylate or epoxy acrylate and the migrating plasticizers come into spaces between molecules of these resins. For this reason, as long as crosslink points of molecules are firm, the cable jacket 20 itself hardly becomes cracked even with the plasticizers migrating to cause swelling. However, as the crosslink points start breaking because of hydrochloric acid emanating from PVC, the cable jacket 20 becomes easier to crack due to the swelling.

The present invention has been accomplished to solve the above problem and it is an object of the present invention to provide an optical fiber and an optical cable with a structure for enabling long-term use without deterioration of the coating such as occurrence of cracking, even in environments in which the plasticizer with a low molecular weight migrates into the optical fiber side.

In order to solve the above problem, an optical fiber according to an embodiment of the present invention comprises a glass fiber extending along a central axis, and a coating surrounding an outer peripheral surface of the glass fiber. The coating is composed of a plurality of layers laid along a radial direction from the central axis of the optical fiber and each of the plurality of coating layers is comprised of an ultraviolet curable resin or a thermosetting resin. The glass fiber comprises at least a core functioning as a signal transmission line. A cladding surrounding the outer periphery of the core is comprised of glass or resin. The optical fiber may further comprise a hermetic coat layer comprised of a low-melting-point glass surrounding an outer peripheral surface of the cladding, in addition to the core and the cladding.

Particularly, in a first aspect of the present embodiment, two coating layers selected from the plurality of layers constituting the coating are designed as to swelling rates thereof with a plasticizer for polyvinyl chloride resin so that an inside coating layer closer to the glass fiber has the smaller swelling rate than an outside coating layer farther from the glass fiber than the inside coating layer. Therefore, in cases where the coating is composed of three or more layers, the layers are designed as to the swelling rates thereof with the plasticizer for polyvinyl chloride resin or the like so that the swelling rates successively increase from the coating layer in contact with the outer peripheral surface of the glass fiber to the coating layer located outermost.

As a second aspect applicable to the first aspect, when the inside coating layer and the outside coating layer are adjacent coating layers in contact with each other, the inside coating layer and the outside coating layer preferably satisfy the following relation:

$$(d1/2) \times (1+\alpha 1) \leq (d2/2 - t2) \times (1+\alpha 2),$$

where, in a cross section of the optical fiber perpendicular to the central axis, d1 represents an outer diameter of the inside coating layer, t1 a thickness of the inside coating layer, α1 the swelling rate of the inside coating layer, d2 an outer diameter of the outside coating layer, t2 a thickness of the outside coating layer, and α2 the swelling rate of the outside coating layer.

As a third aspect applicable to at least either one of the first and second aspects, the plasticizer is preferably a plasticizer for polyvinyl chloride. As a fourth aspect applicable to at least either one of the first and second aspects, the plasticizer preferably contains at least any one of phthalate, dioctyl phthalate (DOP or DEHP), diisononyl phthalate (DINP), diisodecyl phthalate (DIDP), dibutyl phthalate (DBP), adipate, dioctyl adipate (DOA or DEHA), diisononyl adipate (DINA), trimellitate, trioctyl trimellitate (TOTM), polyester, phosphate, tricresyl phosphate (TCP), citrate, acetyl tributyl citrate (ATBC), epoxidized oil, epoxidized soybean-oil (ESBO), epoxidized linseed-oil (ELSO), sebacate, and azelate.

In a fifth aspect of the present embodiment, two coating layers selected from the plurality of layers constituting the coating are designed so that a crosslink density of an inside coating layer closer to the glass fiber is larger than a crosslink density of an outside coating layer farther from the glass fiber than the inside coating layer. In the fifth aspect as well, in the cases where the coating is composed of three or more layers, the coating layers are designed as to the crosslink densities thereof so that the crosslink densities successively decrease from the coating layer in contact with the outer peripheral surface of the glass fiber to the coating layer located outermost.

Furthermore, in a sixth aspect of the present embodiment, two coating layers selected from the plurality of layers constituting the coating are designed as to an elongation at break thereof so that an inside coating layer closer to the glass fiber has the smaller elongation at break than an outside coating layer farther from the glass fiber than the inside coating layer. In the sixth aspect as well, in the cases where the coating is composed of three or more layers, the coating layers are designed as to the elongation at break thereof so that the elongation at break successively increase from the coating layer in contact with the outer peripheral surface of the glass fiber to the coating layer located outermost.

An optical cable according to an embodiment of the present invention comprises the optical fiber according to at least any one of the above first to sixth aspects, and a cable jacket of resin provided around the coating of the optical fiber.

Each of embodiments according to the present invention will become more fully understood from the detailed description given hereinbelow and the accompanying drawings. These embodiments are presented by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, and it is apparent that various modifications and improvements within the scope of the invention would be obvious to those skilled in the art from this detailed description.

DETAILED DESCRIPTION OF EMBODIMENTS

Figure 1:
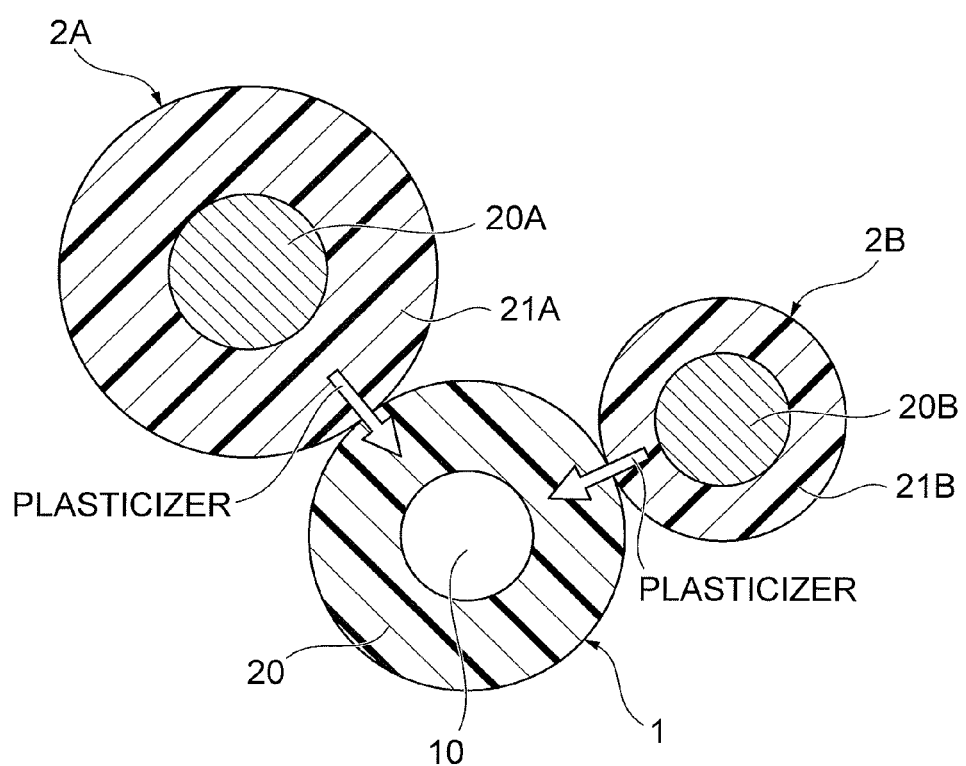
FIG. 1 is a drawing for explaining a state of migration of plasticizers from PVC electric cables into an optical fiber.

Each of embodiments of the optical fiber and optical cable according to the present invention will be described below in detail with reference to the accompanying drawings. The same elements will be denoted by the same reference signs in the description of the drawings, without redundant description.

When an optical cable is used under the aforementioned high-temperature environment in which oil or the PVC electric cable is present around it, an example of cracking occurring in the coating is assumed to be such that the oil or the plasticizer (phthalate or the like) for PVC migrates into resin with a low modulus of elasticity to swell each of a plurality of layers (resin layers) constituting the coating, resulting in breakage of the coating layer with a low elongation at break. In a configuration wherein the coating layer located outside among the plurality of coating layers is more likely to become swollen, the entire coating is unlikely to crack, whereas in a configuration wherein the coating layer located inside among the plurality of coating layers is more likely to become swollen, the coating layer located outside is forcibly expanded between molecules because of the swelling of the coating layer located inside, so as to possibly result in cracking of the entire coating. For this reason, the optical fiber cable with a plurality of coating layers on the outer peripheral surface of the glass fiber according to the present invention is designed as to swelling rates with the plasticizer for PVC so that the swelling rate of the outside coating layer located outside is set larger than that of the inside coating layer in contact with the glass fiber (in a configuration provided with a core and a cladding or in a configuration further provided with a hermetic coat layer), or, so that even if the swelling rate with the plasticizer for PVC or the like, of the outside coating layer located outside is smaller than that of the inside coating layer in contact with the glass fiber, an elongation at break of the outside coating layer is set larger than that of the inside coating layer. A difference between the elongation at break of the inside coating layer and the outside coating layer is made depending upon a level of a difference between the swelling rates of the inside coating layer and the outside coating layer, whereby, even with elongation of the outside coating layer due to the swelling of the inside coating layer, the elongation of the outside coating layer is kept within the range of the elongation at break thereof. The same effect is also achieved by such setting that the crosslink density of the inside coating layer is set larger than that of the outside coating layer. A difference between the crosslink densities of the inside coating layer and the outside coating layer is made depending upon a level of the difference between the swelling rates of the inside coating layer and the outside coating layer. The difference between the crosslink densities of the two layers is made so that the inside coating layer and the outside coating layer are swollen without occurrence of cracking of the outside coating layer, while the swell of the inside coating layer is more suppressed by the degree of the difference of the crosslink density of the inside coating layer from the other, than the swell of the outside coating layer.

Figure 2:
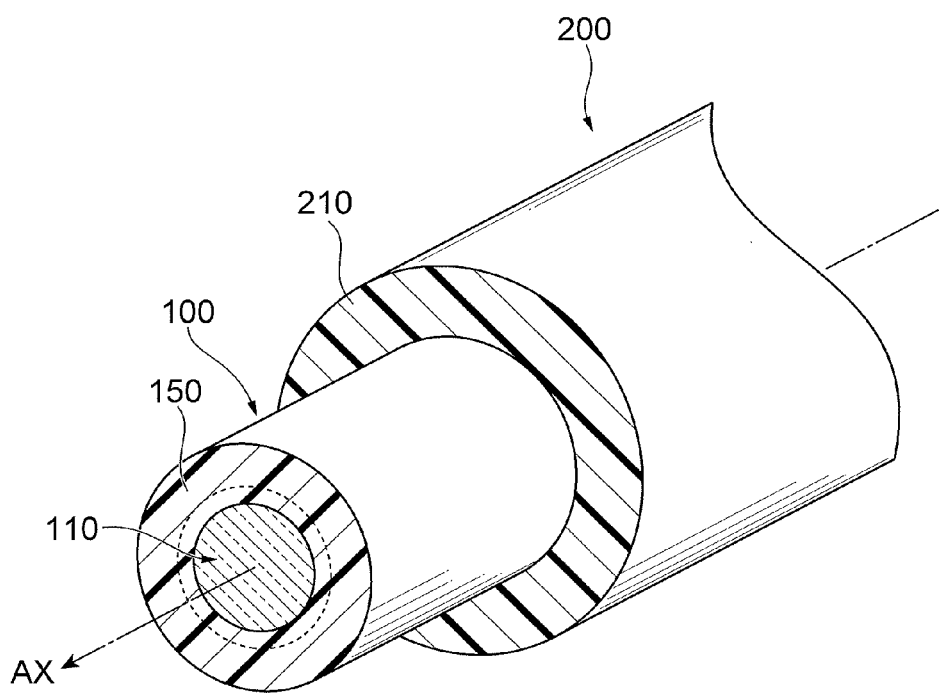
FIG. 2 is a drawing showing an example of a cross-sectional structure of an optical cable according to an embodiment of the present invention.
Figure 3A:
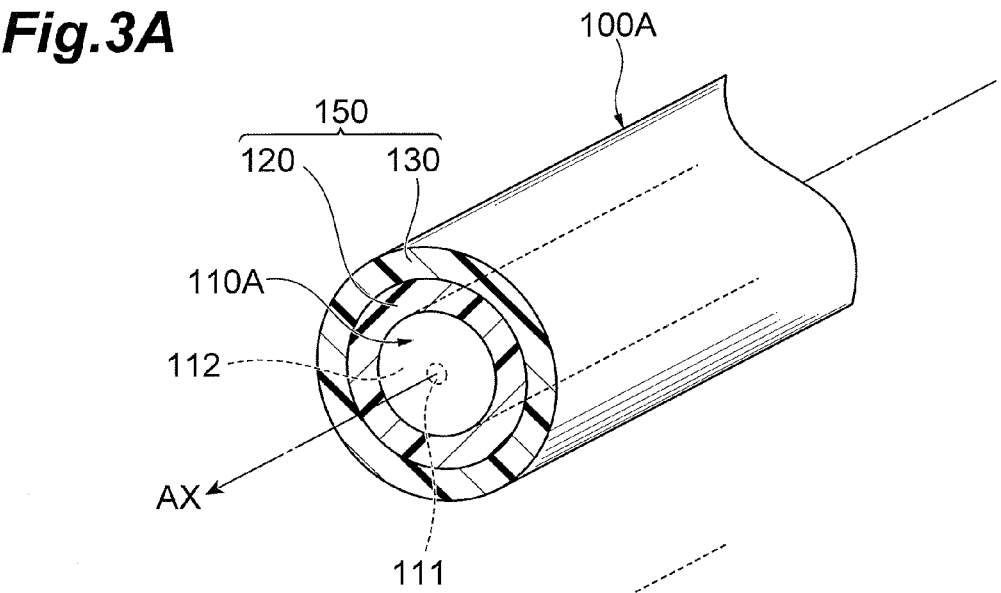
FIGS. 3A to 3C are drawings showing examples of various optical fibers applicable to an optical fiber of the optical cable according to the embodiment shown in FIG. 2.
Figure 3B:
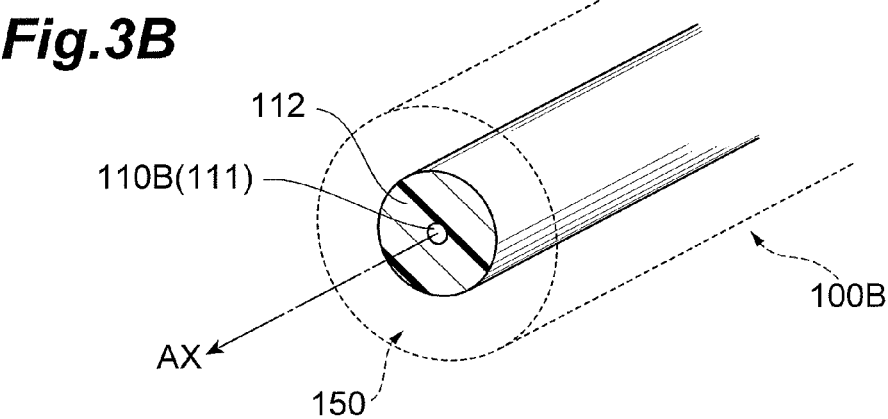
Figure 3C:
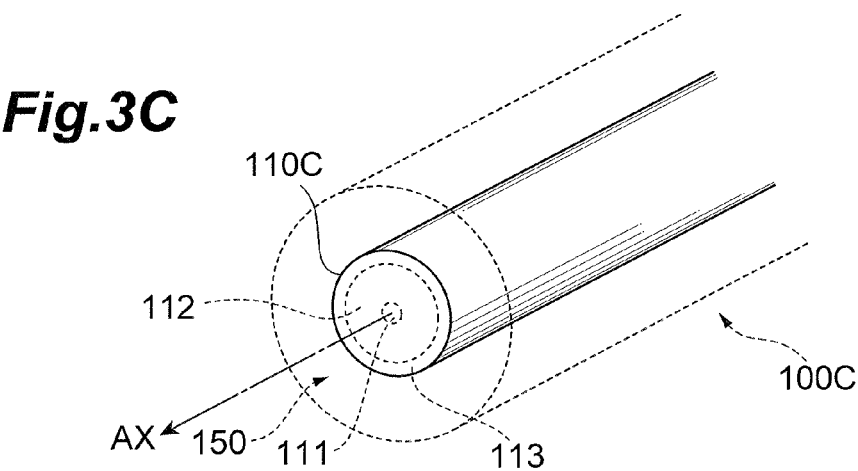

A specific structure of the optical cable according to an embodiment of the present invention will be described below. FIG. 2 is a drawing showing an example of a cross-sectional structure of an optical cable according to an embodiment of the present invention. FIGS. 3A to 3C are drawings showing examples of optical fibers having various cross-sectional structures, which are applicable to an optical fiber 100 in the optical cable 200 in FIG. 2. For example, FIG. 3A is a drawing showing an example of a cross-sectional structure of an optical fiber 100A according to an embodiment of the present invention, FIG. 3B a drawing showing an example of a cross-sectional structure of an optical fiber 100B according to an embodiment of the present invention, and FIG. 3C a drawing showing an example of a cross-sectional structure of an optical fiber 100C according to an embodiment of the present invention.

As shown in FIG. 2, the optical cable 200 of the present embodiment has the optical fiber 100 extending along the central axis (optical axis AX) (which is the optical fiber according to the present embodiment), and a cable jacket 210 of resin as a coating on the optical fiber 100. The optical fiber 100 has a glass fiber 110, and a coating 150 surrounding the glass fiber 110 and consisting of a plurality of resin layers. A variety of cross-sectional structures as shown in FIGS. 3A to 3C are applicable to the optical fiber 100.

The optical fiber 100A shown in FIG. 3A is composed of a glass fiber 110A extending along the central axis (optical axis AX), and the coating 150 surrounding the glass fiber 110A. In the optical fiber 100A, the glass fiber 110A has a core 111 functioning as a light transmission line extending along the central axis, and a cladding 112 surrounding the core 111. The coating 150 has an inside coating layer 120 in contact with the glass fiber 110A, and an outside coating layer 130 provided outside the inside coating layer 120.

The cladding 112 can be made of a plastic material such as urethane (meth)acrylate resin and in this case, the glass fiber is composed of only the core, as shown in FIG. 3B. The optical fiber 100B shown in FIG. 3B has a glass fiber 110B composed of only the core 111, the cladding 112 surrounding the glass fiber 110B and comprised of the plastic material, and the coating 150 surrounding the cladding 112. The structure of the coating 150 in this optical fiber 100B may be composed of one layer, may be the same as the coating 150 of the optical fiber 100A shown in FIG. 3A, or may be composed of three or more coating layers.

On the other hand, the optical fiber 100C shown in FIG. 3C is different in the structure of a glass fiber 110C from the optical fiber 100A. Namely, the optical fiber 100C has the core 111 functioning as a light transmission line extending along the central axis (optical axis AX), the cladding 112 surrounding the core 111, and a hermetic coat layer 113 surrounding the cladding 112. The coating 150 of the optical fiber 100C also has the inside coating layer 120 in contact with the hermetic coat layer 113, and the outside coating layer 130 provided outside the inside coating layer 120 as in the structure shown in FIG. 3A. It is a matter of course that the coating 150 in FIG. 3C may be composed of three or more coating layers.

Figure 4:
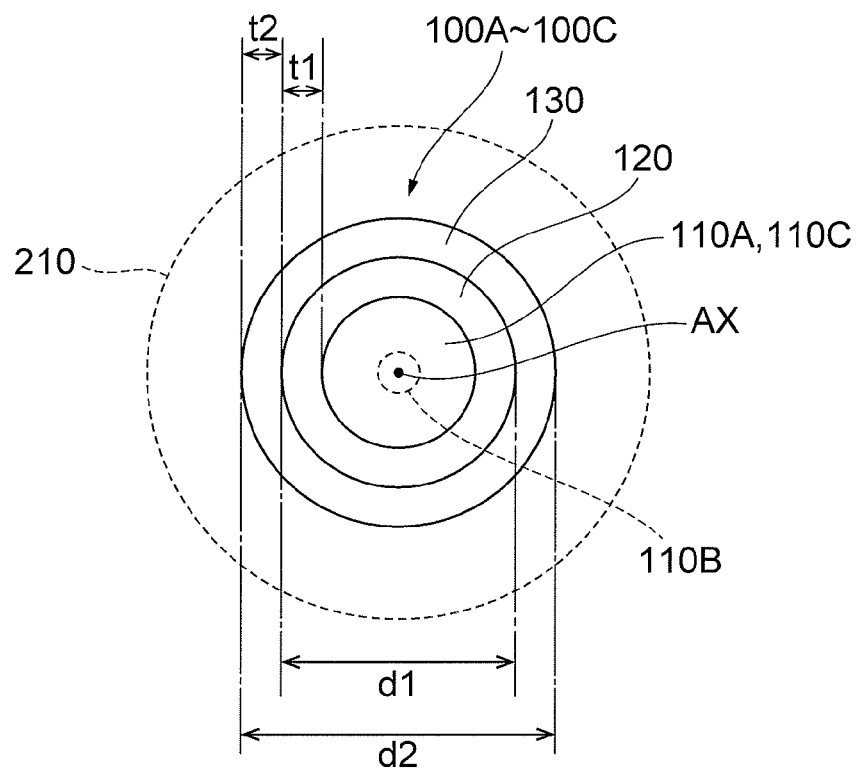
FIG. 4 is a drawing for explaining structural parameters of the optical fiber according to the embodiment.

FIG. 4 shows a cross-sectional front view of the optical fibers 100A to 100C (corresponding to the optical fiber 100 of the optical cable 200) according to the present embodiment. Namely, the coating layer 120 (inside coating) provided on the outer periphery of the glass fiber 110A or 110C (or the plastic cladding 112 surrounding the glass fiber 110B) has the outer diameter d1 and the thickness t1 along the radial direction. The coating layer 130 (outside coating) provided outside the coating layer 120 has the outer diameter d2 and the thickness t2 along the radial direction. As the coating layers 120, 130 become swollen, stresses of both of inward expansion and outward expansion act in the radial direction from the optical axis AX. In each coating layer, the inward expansion in the coating layer is released to the outward by the swell and the inward also expands as pulled by the force. However, when the swelling rate of the coating layer 120 located inside is higher than that of the coating layer 130 located outside, the coating layers 120, 130 both are subject to compressive stress. The entire coating is likely to expand outward from a steady state, in order to release the compressive stress. If in this state crosslink points in each coating layer are broken because of hydrochloric acid, ultraviolet light, heat, and so forth, the coating can crack or break eventually.

Then, the present embodiment involves setting the swelling rates of the coating layers 120, 130 in contact with each other as shown in FIG. 4, among a plurality of layers constituting the coating (which may be three or more layers), so as to satisfy the following relation:

$$(d1/2) \times (1+\alpha 1) \le (d2/2 - t2) \times (1+\alpha 2),$$

thereby to prevent the breakage of the coating in the optical fibers 100A to 100C.

A swelling rate is measured by immersing an optical fiber as an object in a plasticizer (liquid) and measuring volumes or weights before and after the immersion, and is expressed as a percentage of a ratio of the volumes or weights before and after the immersion. The plasticizer to be used may be a plasticizer for PVC or the like (e.g., phthalate).

Figure 5:
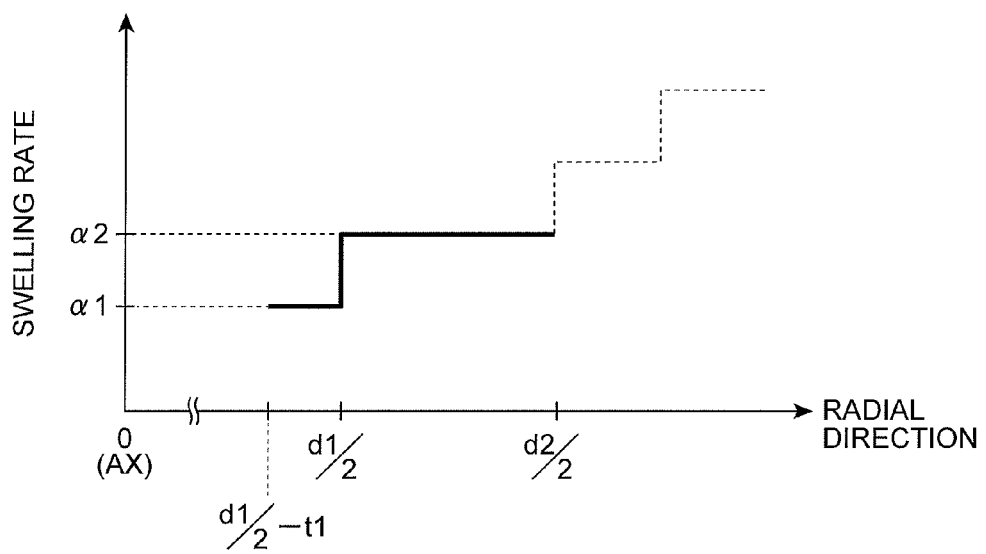
FIG. 5 is a graph for explaining a magnitude relation of swelling rates between coating layers.

FIG. 5 is a graph for explaining the magnitude relation of swelling rates between the coating layers 120, 130. Particularly, the present embodiment is designed as to the swelling rates with the plasticizer for polyvinyl chloride resin so that the swelling rate of the coating layer 120 (inside coating) is smaller than that of the coating layer 130 (outside coating). In cases where the coating is composed of three or more layers, the swelling rates thereof with the plasticizer for polyvinyl chloride resin are designed, as indicated by a dashed line in FIG. 5, so that they successively increase from the coating layer in contact with the outer peripheral surface of the glass fiber 110A or 110C (or the plastic cladding 112 surrounding the glass fiber 110B) to the coating layer located outermost in the cable jacket. Phthalate is known as typical plasticizer for polyvinyl chloride resin.

Figure 6:
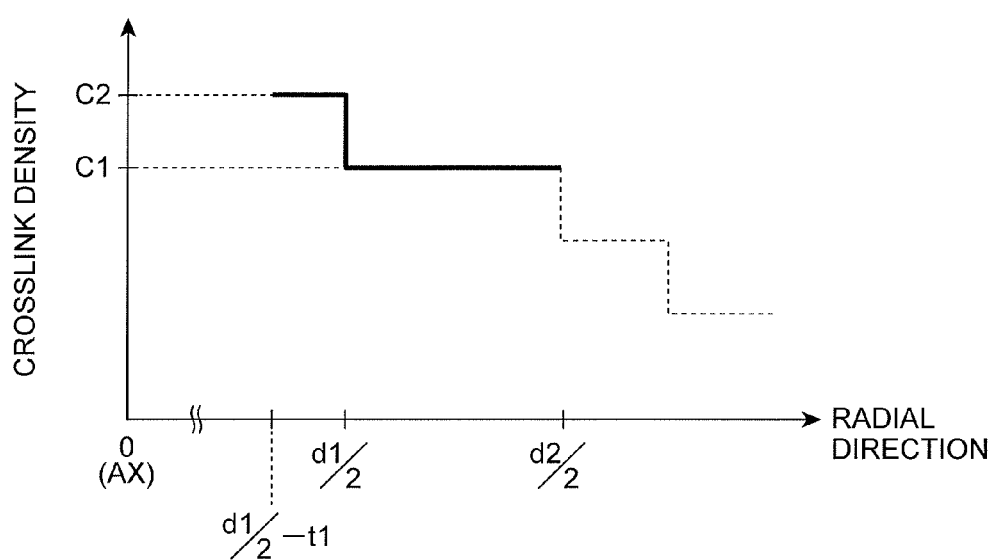
FIG. 6 is a graph for explaining a magnitude relation of crosslink densities between coating layers.

FIG. 6 is a graph for explaining the magnitude relation of crosslink densities between the coating layers 120, 130. The present embodiment is designed so that the crosslink density of the coating layer 120 (inside coating) is larger than that of the coating layer 130 (outside coating). In the cases where the coating 150 is composed of three or more layers, the crosslink densities thereof are designed, as indicated by a dashed line in FIG. 6, so that they successively decrease from the coating layer in contact with the outer peripheral surface of the glass fiber 110A or 110C (or the plastic cladding 112 surrounding the glass fiber 110B) to the coating layer located outermost in the cable jacket.

A crosslink density of a cured product (each coating layer in the case of the present embodiment) is obtained from the following equation by measurement of dynamic viscoelasticity.

$$p = G''/\phi RT$$

In this equation, G' represents the storage elastic modulus at temperature T, $\phi$ the front factor (assumed to be 1), R the gas constant, and T a temperature which is not less than Tg and at which G' becomes approximately flat against temperature, when measured by DMA (Dynamic Mechanical Analysis), the temperature T being given approximately as T=Tg (glass transition temperature)+30° C. The glass transition temperature Tg is measured by Differential Scanning Calorimetry (DSC) and Thermo Mechanical Analysis (TMA).

Figure 7:
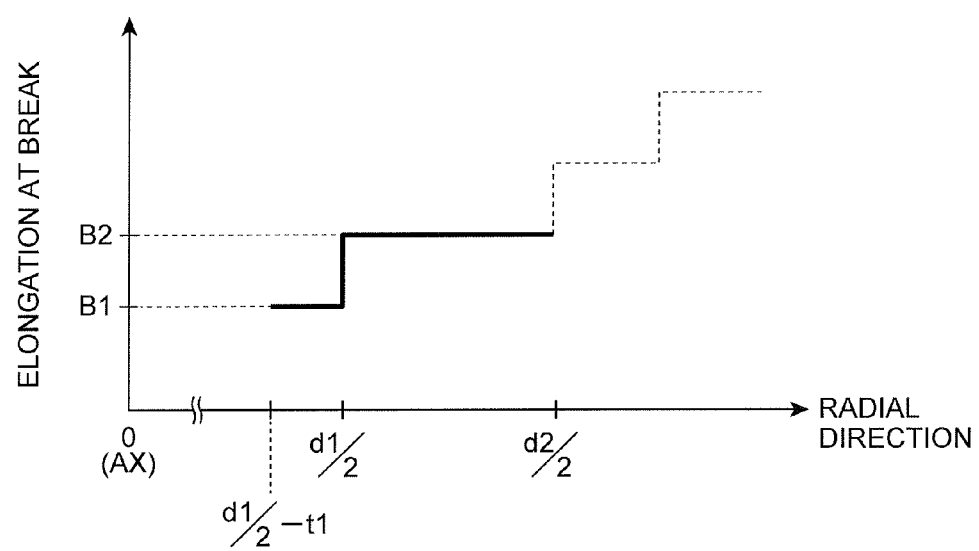
FIG. 7 is a graph for explaining a magnitude relation of elongation at break between coating layers.

Furthermore, FIG. 7 is a graph for explaining the magnitude relation of elongation at break between the coating layers

120, 130. The present embodiment is designed as to the elongation at break with the plasticizer for polyvinyl chloride resin so that the elongation at break of the coating layer 120 (inside coating) is smaller than that of the coating layer 130 (outside coating). In the example of FIG. 7 as well, in the cases where the coating is composed of three or more layers, the elongation at break thereof with the plasticizer for polyvinyl chloride resin are designed so that they successively increase from the coating layer in contact with the outer peripheral surface of the glass fiber 110A or 110C (or the plastic cladding 112 surrounding the glass fiber 110B) to the coating layer located outermost.

The measurement of each elongation at break with the plasticizer is carried out by a method conforming to ASTM D882 Standard, to measure the elongation break with the plasticizer while a film is kept in contact with the plasticizer.

(Plasticizer)

The plasticizer applicable to PVC will be described below. Plasticizer is the general term of additive chemicals to be added in thermoplastic synthetic resin to improve flexibility and weatherability thereof, and it is also used for making PVC more flexible.

In general, a thermoplastic resin has a glass transition temperature (also called a glass transition point), and the resin exhibits well-ordered crystallinity of molecular arrangement at temperatures below the glass transition temperature but an amorphous state of molecular arrangement in a temperature zone from the glass transition temperature to a melting point. The thermoplastic resin in the amorphous state demonstrates flexibility and high optical transparency and thus is useful in many applications. On the other hand, the crystalline resin is opaque and becomes fragile against impact and external force with progress of crystallinity at low temperatures, often demonstrating properties deemed as disadvantages in use of the resin.

Since the melting point and glass transition point are determined by a type of the resin and the degree of polymerization thereof, the temperature characteristics of the resulting resin do not always agree with those of a desired product. Addition of an additive in the thermoplastic resin expands the temperature zone of the amorphous state to prevent fragility from appearing even at low temperatures and to enhance flexibility, realizing the resin with desired temperature and physical properties. A chemical added for this purpose is the plasticizer. The plasticizer further increases elasticity, thereby to improve moldability as well; for example, it becomes easier to release a molded product from a die during injection molding.

The plasticizer comes into spaces of the resin to inhibit the resin from being regularly oriented, whereby the resin is maintained in the amorphous state even at temperatures below the glass transition point. Therefore, the plasticizer having large side chains often demonstrates useful properties. If the plasticizer is incompatible with the objective resin, phase separation will occur between the resin and the plasticizer; therefore, the plasticizer needs to have a characteristic of wide compatibility with various resins while causing no phase separation.

Particularly, in the case of polyvinyl chloride (PVC), products with a wide variety of properties are prepared by addition of the plasticizer. Typical examples of the plasticizer used include phthalates, among which DEHP and DINP have properties as ideal general-purpose plasticizers and are manufactured in large quantities.

(Examples of Plasticizer)

Examples of the plasticizer include phthalate, dioctyl phthalate (DOP or DEHP), diisononyl phthalate (DINP), diisodecyl phthalate (DIDP), dibutyl phthalate (DBP), adipate, dioctyl adipate (DOA or DEHA), diisononyl adipate (DINA), trimellitate, trioctyl trimellitate (TOTM), polyester, phosphate, tricresyl phosphate (TCP), citrate, acetyl tributyl citrate (ATBC), epoxidized oil, epoxidized soybean-oil (ESBO), epoxidized linseed-oil (ELSO), sebacate, and azelate.

Phthalate is the general term of esters of phthalic acid (ortho-isomer) and alcohol. Phthalates of higher alcohols typified by bis(2-ethylhexyl)phthalate are useful as plasticizers (phthalic acid-based plasticizers). Industrially in general, phthalic acid is esterified by azeotropic dehydration of water and alcohol from phthalic acid (free acid) and excess alcohol. Table 1 below provides the abbreviation, molecular weight, melting point (° C.), boiling point (° C.), and CAS number of each of major compounds of phthalates.

TABLE 1

| Compound name | Abbr. | Mol. wt. | Melting point (° C.) | Boiling point (° C.) | CAS number |
|---|---|---|---|---|---|
| Dimethyl phthalate | DMP | 194.19 | 2 | 282 | [131-11-3] |
| Diethyl phthalate | DEP | 222.24 | −3 | 289-299 | [84-66-2] |
| Diallyl phthalate | DAP | 246.26 | −70 | 165-167(*) | [131-17-9] |
| Dibutyl phthalate | DBP | 278.35 | −35 | 340 | [84-74-2] |
| Diisobutyl phthalate | DIBP | | | 327 | [84-69-5] |
| Di-n-hexyl phthalate | DHP | | | | [84-75-3] |
| Dioctyl phthalate | DOP | 390.56 | −50 | 384 | [117-81-7] |
| Bis(2-ethylhexyl)phthalate | DEHP | | | | |
| Di-n-octyl phthalate | DnOP | 390.56 | | | |
| Diisononyl phthalate | DINP | 418 | | 403 | [28553-12-0] [68515-48-0] |
| Dinonyl phthalate | DNP | 418 | | | |
| Diisodecyl phthalate | DIDP | 446 | −50 | 420 | [26761-40-0] |
| Benzyl butyl phthalate | BBP | 312 | | 370 | |
| Bis(butylbenzyl)phthalate | BBzP | | | | |

(*)° C./5 mmHg (Materials of Coating Layers)

Constituent materials of the coating 150 in the optical fiber of the present embodiment will be described below. Each of the coating layers 120, 130 is comprised of an ultraviolet (UV) curable resin or a thermosetting resin and types and properties of the UV curable resins applicable to each coating layer will be described below.

The UV curable resins are roughly classified into the radical polymerization type of acrylate and the cation polymerization type of epoxy. The radical polymerization type consists primarily of acrylate and has a cure shrinkage rate of 5 to 10%. The radical polymerization type is subject to curing inhibition by oxygen, curing reaction also stops after termination of irradiation with UV, and the curing is less accelerated by heat. Furthermore, the radical polymerization type is characterized by moderate thermal resistance and moderate chemical resistance, and has a large degree of freedom of resin design. On the other hand, the cation polymerization type consists primarily of epoxy and has a cure shrinkage rate of 2 to 4%. The cation polymerization type is free of the curing inhibition by oxygen, the curing reaction continues even after termination of irradiation with UV, and the curing is accelerated by heat. Furthermore, the cation polymerization type is characterized by good thermal resistance and good chemical resistance but has a small degree of freedom of resin design.

The radical polymerization type is further classified under epoxy acrylate, urethane acrylate, and silicone acrylate.

The cable jacket 210 can be comprised of a thermoplastic resin, e.g., a polyolefin-based resin such as polyethylene or polypropylene, or polyamide. The cable jacket 210 imparts mechanical strength to the optical fiber 100 (100A-100C). The diameter of the optical fiber 100 (100A-100C) can be in the range of 0.25 to 0.5 mm, and the diameter of the optical cable 200 in the range of 1 to 3 mm. The thickness of the cable jacket 210 can be in the range of 0.3 to 1 mm. Aramid fiber functions as a tension member of the optical cable 200 and Kevlar (registered trademark) or the like is available.

As constructed as described above, the optical fiber and the optical cable according to the present invention can be used for a long term without deterioration of the coating such as cracking of the cable jacket, even in the environments in which the oil content such as the plasticizer with a low molecular weight migrates into the optical fiber side.

From the above description of the present invention, it will be obvious that the invention may be varied in many ways. Such variations are not to be regarded as a departure from the spirit and scope of the present invention, and all improvements as would be obvious to those skilled in the art are intended for inclusion within the scope of the following claims.

What is claimed is:

1. An optical fiber comprising: a glass fiber; and a coating surrounding the glass fiber, wherein the coating is laid on the glass fiber along a radial direction from a central axis of the optical fiber and
    comprises an inside coating layer and an outside coating layer surrounding the inside coating layer,
    wherein the inside coating layer is comprised of an ultraviolet curable resin or thermosetting resin which has a swelling rate with a plasticizer for polyvinyl chloride resin,
    wherein the outside coating layer is comprised of an ultraviolet curable resin or thermosetting resin which has a swelling rate with a plasticizer for polyvinyl chloride resin,
    wherein the swelling rate of the inside coating layer is smaller than the swelling rate of the outside coating layer, and
    wherein the plasticizer contains at least any one of phthalate, dioctyl phthalate, diisononyl phthalate, diisodecyl phthalate, dibutyl phthalate, adipate, dioctyl adipate, diisononyl adipate, trimellitate, trioctyl trimellitate, phosphate, tricresyl phosphate, citrate, acetyl tributyl citrate, epoxidized oil, epoxidized soybean-oil, epoxidized linseed-oil, sebacate, and azelate.

2. The optical fiber according to claim 1, wherein the inside coating layer and the outside coating layer are adjacent coating layers in contact with each other.

3. An optical cable comprising: the optical fiber as defined in claim 1; and a cable jacket of resin provided around the coating of the optical fiber.

4. The optical fiber according to claim 1, wherein a crosslink density of the inside coating layer is larger than a crosslink density of the outside coating layer.

5. An optical cable comprising: the optical fiber as defined in claim 4; and a cable jacket of resin provided around the coating of the optical fiber.

6. The optical fiber according to claim 1, wherein an elongation break of the inside coating layer is smaller than an elongation at break of the outside coating layer.

7. An optical cable comprising: the optical fiber as defined in claim 6; and a cable jacket of resin provided around the coating of the optical fiber.

* * * * *